M. BLOCK.
Manufacture of Graduated Glassware.

No. 217,050. Patented July 1, 1879.

WITNESSES
H. Aubrey Toulmin.
J. J. McCarthy.

INVENTOR
Marx Block.
By his Attorneys
Alexander Mason

UNITED STATES PATENT OFFICE.

MARX BLOCK, OF CHATTANOOGA, TENNESSEE.

IMPROVEMENT IN THE MANUFACTURE OF GRADUATED GLASSWARE.

Specification forming part of Letters Patent No. 217,050, dated July 1, 1879; application filed September 12, 1878.

*To all whom it may concern:*

Be it known that I, MARX BLOCK, of Chattanooga, in the county of Hamilton, and in the State of Tennessee, have invented certain new and useful Improvements in Manufacture of Graduated Glassware; and do hereby declare that the following is a full, clear, and exact description thereof, reference being had to the accompanying drawings, and to the letters of reference marked thereon, making a part of this specification.

My invention relates to the manufacture of graduated glassware; and it consists in a cup or other article of glassware formed on the inside with graduations extending entirely around the same, and also in the construction of a plunger for forming such graduated glassware, as will be hereinafter more fully set forth.

In order to enable others skilled in the art to which my invention appertains to make and use the same, I will now proceed to describe its construction and operation, referring to the annexed drawings, in which—

Figure 1:
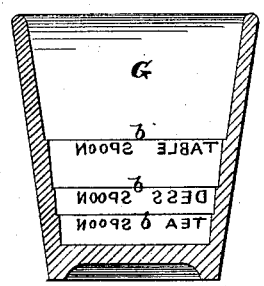
Figure 2:
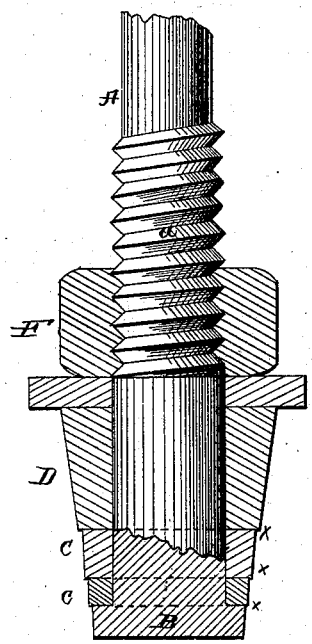
Figure 3:
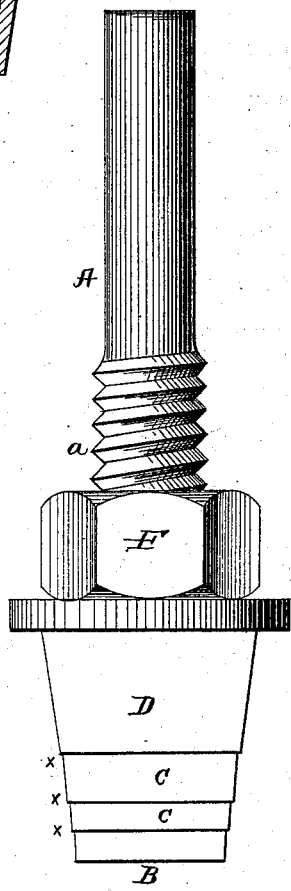

Figure 1 is a vertical section of a cup having graduations on the inside and extending all around. Fig. 2 is a longitudinal section of the plunger, and Fig. 3 is a side view of the same.

The plunger for making my graduated glassware consists of a shaft or mandrel, A, having a head, B, at its lower end, and at a suitable point on the shaft or mandrel are formed exterior screw-threads, $a$.

Over the shaft, and resting upon the head, are placed one, two, or more tapering rings, $c\ c$, which are of gradually-increasing dimensions—that is to say, the diameter of the first ring is slightly larger than that of the head B; the diameter of the second ring is slightly larger than that of the first, and so on; while the variation in the thickness of said head and rings depends upon the graduations desired.

On top of the rings $c$ is placed a follower, D, and all the parts are held together by a nut, F, screwed on the shaft.

An ordinary mold for molding glassware is used, and when the plunger is inserted therein to form the glass the edges $x\ x$ of the rings form shoulders $b\ b$ around the inside of the glass G.

These shoulders, which constitute the graduations, may be any desired distance apart, according to the size of the rings, $c$, used in the plunger. These rings being removable, any desired number may be used as required for forming the exact kind of graduations wanted.

I am aware that a sheet-metal measure has been made with graduated shoulders or offsets on the outside, and I do not claim such as my invention; nor do I broadly claim the scale-divisions on the glass made in continuous unbroken lines; but in such case as known to me the lines are on the exterior surface of the glass.

By my invention the outside of the glass is left smooth, and the graduations are on the inside in the form of shoulders extending entirely around the glass, so that the exact quantity can easily be measured without liability of mistakes, as the slightest variation caused by an inclination of the vessel on any side would be detected at once on account of the circular rings or shoulders. This is an important advantage not obtained by any other inside graduated measure known.

Having thus fully described my invention, what I claim as new, and desire to secure by Letters Patent, is—

1. As a new article of manufacture, graduated glassware having the graduations in the form of shoulders on the inside of the glass, and extending entirely around the same, substantially as and for the purposes herein set forth.

2. In a plunger for molding glassware, a mandrel-head and one or more removable tapering rings arranged on the plunger to form shoulders around the inside of the glass, for the purposes herein set forth.

3. The combination of the threaded shaft A with head B, removable tapering rings $c$, follower D, and nut F, all constructed substantially as and for the purposes herein set forth.

In testimony that I claim the foregoing I have hereunto set my hand this 30th day of August, 1878.

MARX BLOCK.

Witnesses:
H. AUBREY TOULUME,
J. J. MCCARTHY.